US 10,550,919 B2

(12) United States Patent
Appleyard

(10) Patent No.: US 10,550,919 B2
(45) Date of Patent: Feb. 4, 2020

(54) GEARBOX ASSEMBLY FOR AN ELECTRIC POWER STEERING ASSEMBLY

(71) Applicant: TRW Limited, Solihull, West Midlands (GB)

(72) Inventor: Michael Appleyard, Cheltenham (GB)

(73) Assignee: TRW Limited, Solihull, West Midlands (GB)

( * ) Notice: Subject to any disclaimer, the term of this patent is extended or adjusted under 35 U.S.C. 154(b) by 104 days.

(21) Appl. No.: 15/560,505

(22) PCT Filed: Mar. 21, 2016

(86) PCT No.: PCT/GB2016/050780
§ 371 (c)(1),
(2) Date: Sep. 22, 2017

(87) PCT Pub. No.: WO2016/151306
PCT Pub. Date: Sep. 29, 2016

(65) Prior Publication Data
US 2018/0058556 A1 Mar. 1, 2018

(30) Foreign Application Priority Data
Mar. 24, 2015 (GB) .................................. 1504958.8

(51) Int. Cl.
*F16H 35/06* (2006.01)
*B62D 5/04* (2006.01)
(Continued)

(52) U.S. Cl.
CPC ........... *F16H 35/06* (2013.01); *B62D 5/0403* (2013.01); *B62D 5/0409* (2013.01); *F16H 1/16* (2013.01);
(Continued)

(58) Field of Classification Search
CPC ... F16H 35/06; F16H 57/12; F16H 2057/0213
See application file for complete search history.

(56) References Cited

U.S. PATENT DOCUMENTS 9,638,307 B2 * 5/2017 Kikuchi ............... B62D 5/0409
2005/0224278 A1 10/2005 Segawa
(Continued)

OTHER PUBLICATIONS

Patent Acts 1977: Search Report under Section 17(5), Application No. GB1504958.8, dated Sep. 3, 2015.
(Continued)

*Primary Examiner* — Terence Boes
(74) *Attorney, Agent, or Firm* — MacMillan, Sobanski & Todd, LLC

(57) ABSTRACT

A gearbox assembly for an electric power assisted steering apparatus comprising: a first pivoting means for the worm shaft main bearing which reacts the axial component of the worm shaft tooth load for a first direction of gearwheel torque but not for a second, opposing, direction of gearwheel torque and defines at least one first pivot point about which the main bearing pivots that is located on a pivot axis, a second pivoting means for the worm shaft main bearing, positioned distal from the first pivoting means, which reacts the axial component of the worm shaft tooth load for the second direction of gearwheel torque but not the first direction of gearwheel torque and defines at least one second pivot point about which the main bearing pivots that is located on a second pivot axis, the second pivot point being spaced apart from the first pivot point.

10 Claims, 6 Drawing Sheets

(51) Int. Cl.
    *F16H 1/16*      (2006.01)
    *F16H 57/021*    (2012.01)
    *F16H 57/028*    (2012.01)
    *F16H 57/039*    (2012.01)
    *F16H 57/12*     (2006.01)

(52) U.S. Cl.
    CPC ......... *F16H 57/021* (2013.01); *F16H 57/028* (2013.01); *F16H 57/039* (2013.01); *F16H 57/12* (2013.01); *F16H 2057/0213* (2013.01); *F16H 2057/127* (2013.01)

(56) References Cited

U.S. PATENT DOCUMENTS

| | | | |
|---|---|---|---|
| 2007/0125193 A1 | 6/2007 | Augustine et al. | |
| 2014/0020973 A1 | 1/2014 | Galehr | |
| 2014/0202274 A1* | 7/2014 | Durand | F16H 1/16 74/425 |
| 2015/0040699 A1* | 2/2015 | Hafermalz | F16H 57/039 74/89.16 |
| 2018/0003291 A1* | 1/2018 | Figura | F16H 1/16 |
| 2018/0073627 A1* | 3/2018 | Gibbs | B62D 5/0409 |
| 2018/0187768 A1* | 7/2018 | Friederich | F16C 27/04 |
| 2019/0040945 A1* | 2/2019 | Ueda | F16H 57/039 |

OTHER PUBLICATIONS

PCT International Search Report and the Written Opinion, Application No. PCT/GB2016/050780 filed Mar. 21, 2016, dated May 31, 2016.

\* cited by examiner

GEARBOX ASSEMBLY FOR AN ELECTRIC POWER STEERING ASSEMBLY

CROSS-REFERENCE TO RELATED APPLICATIONS

This application is a national stage of International Application No. PCT/GB2016/050780, filed 21 Mar. 2016, the disclosures of which are incorporated herein by reference in entirety, and which claimed priority to Great Britain Patent Application No. 1504958.8, filed 24 Mar. 2015, the disclosures of which are incorporated herein by reference in entirety.

BACKGROUND OF THE INVENTION

This invention relates to gearbox assemblies for electric power steering assemblies.

Electric power steering systems use an electric motor to produce an assistance torque that is applied to a rotating part of the steering system. In a conventional arrangement this torque assists the driver in turning the wheel. Because motors work best at relatively high speeds and because compact motors produce relatively low torques, the connection between the output of the motor and the steering column is usually through a reduction gearbox.

The most widely used type of electric power assisted steering reduction gearboxes are of a relatively simple worm and gear configuration similar to that shown in FIG. 1 of the accompanying drawings. The gearbox typically comprises a gearbox housing which houses a worm shaft and a gear wheel. The worm shaft is connected to the output of an electric motor. The motor may be secured to an end face of the housing or even located within the housing. The worm shaft is supported by a main bearing at an end closest to the motor and a tail bearing at an end furthest from the motor, both bearings typically comprising ball bearings supported within an inner bearing race that is threaded onto the worm shaft and an outer bearing race that is secured to the housing. The function of the bearings is to allow the worm shaft to rotate whilst to a certain degree limiting axial and radial movement as will be explained. The gear wheel is connected to an output shaft of the gearbox and located so that teeth of the gear wheel engage teeth of the worm shaft.

By choosing appropriate design parameters, this type of gearbox can be made to provide a large speed reduction ratio within compact dimensions. They use a single gear set having a low sliding friction coefficient between the teeth, typically less than 0.05, so that they are "back-driveable". I.e., so that the gear can drive the worm almost as efficiently as the worm can drive the gear. This last attribute is essential for the safety of EPS systems of the kind in which the steering wheel is physically connected to the road wheels enabling some steering effect in the event of a fault at the motor or any other part of the motor control and drive system.

It is known that the speed reduction gearboxes used in electrical power-assisted steering (EPS) apparatus are prone to rattle due to external torsional vibrations acting at their output shafts. These vibrations originate at the road wheels due to surface roughness or unbalanced wheels. Alternatively, mechanical noise can arise from sudden torque reversals applied at the steering wheel by the driver.

The main rattle sites in a worm and wheel gearbox are shown in FIG. 1:—
 (a) at the engagement of the worm and gear teeth and
 (b) at the "main" ball bearing which axially locates the worm shaft.

A well-known solution to the rattle at site (a), namely the so-called "Sprung Worm" mechanism, tends to exacerbate the rattle problem at site (b). An example of such a prior art arrangement is shown in FIG. 1 of the accompanying drawings. In the "Sprung Worm" mechanism, a biasing means such as a leaf spring applies a biasing force that urges the worm shaft into engagement with the wheel gear, the biasing force being chosen such that at low gearwheel torques a dual-flank contact of the worm and gearwheel teeth is achieved while ensuring that there is a transition to single-flank contact between the worm and wheel gear at higher gearwheel torques.

The biasing means requires a small amount of radial movement of the worm shaft and this is achieved by allowing it to pivot around its axis in the plane of the gearwheel by a small angle (typically less than +/−0.5 degrees) either side of its nominal position around an axis which is nominally at the centre of the main bearing at (b). This movement is controlled by
 (i) a specially configured tail bearing at site (c) that is allowed to move by small amounts (typically less than +/−0.5 mm) in a vertical guiding device such as a linear bearing, and
 (ii) the main bearing at (b) has sufficient internal axial clearance between its balls and the sides of its race grooves to permit a small articulation (i.e. tilting) angle which is typically less than +/−0.5 degrees.

Unfortunately, the said axial clearance in the bearing at (b) inevitably allows relative axial free play between the inner and outer races of up to +/−0.2 mm, promoting rattle noises from the bearing when there are reversing torque impulses at the output shaft. These rattle noises can be partly, but not entirely, suppressed by applying a heavy axial biasing force to the worm shaft.

As stated earlier, if dual-flank contact can be maintained for gearwheel torque levels of up to a defined level determined by the amount of biasing force provided, for example 4 Nm, then gear rattle will not be serious problem in general driving. The said 4 Nm is referred to as the "kick-out" torque because it is the gearwheel torque at which the "normal" component of the tooth flank contact force is just sufficient to overcome the inward action of the biasing means and thereby causes the worm shaft to pivot outwards. The outward pivoting movement of the worm shaft is limited by the travel allowed at the tail bearing by its vertical guide. The downward biasing force required on the worm shaft tail bearing to achieve a 4 Nm kick-out torque is typically around 12 N, equating to around 20 N of downward force at the middle of the worm. The kick-out torque is the same for both directions of torque transmission only if the main bearing is pivoted in the tooth contact plane. If the worm shaft is pivoted at the main bearing centre, as shown in FIG. 1, or in any horizontal plane parallel to the nominal worm axis other than that of the tooth contact point, the kick-out torque with be different for the two directions of torque transmission due to the moments created by the axial component of the force resulting from the gearwheel torque.

A significant disadvantage of employing the above described "sprung-worm" method of gear rattle suppression is that the biasing means acting on the tail bearing causes an extra amount quiescent (i.e. background) friction in the gearbox. The increase is typically around a 0.5 Nm compared with a so-called "fixed-centre gearbox" having no worm shaft articulation. This increase is due to the extra rubbing friction which is created between the flanks of the worm and gearwheel teeth when they are forced into mesh by the ARS. The effect is exacerbated both by the "wedge" shape of the teeth, which is a function of their slope or "pressure angle", and by the fact that extra rotational drag felt at the worm shaft is multiplied by the gearbox ratio (typically around 20:1) when measured at the gearwheel axis.

BRIEF SUMMARY OF THE INVENTION

According to a first aspect the invention provides a gearbox assembly for an electric power assisted steering apparatus comprising:

a gearbox housing which houses a worm shaft and a gear wheel, the worm shaft being supported relative to the housing by a main bearing at an end closest to the motor and by a tail bearing at an end furthest from the motor, and the gear wheel being supported by an output shaft having at least one end that provides a take-off from the gearbox assembly, in which the main bearing and tail bearing are free to move relative to the housing through a limited range of motion that enables the worm shaft to pivot away from the wheel gear, the assembly further comprising:

a first pivoting means for the worm shaft main bearing which reacts the axial component of the worm shaft tooth load for a first direction of gearwheel torque but not for a second, opposing, direction of gearwheel torque and defines at least one first pivot point about which the main bearing pivots that is located on a pivot axis, a second pivoting means for the worm shaft main bearing, positioned distal from the first pivoting means, which reacts the axial component of the worm shaft tooth load for the second direction of gearwheel torque but not the first direction of gearwheel torque and defines at least one second pivot point about which the main bearing pivots that is located on a second pivot axis, the second pivot point being spaced apart from the first pivot point.

Providing two different pivot points, each acting to react the worm shaft tooth load for a respective direction of gearwheel torque, it is possible to provide a reduction in the aforesaid quiescent friction in the gearbox while maintaining the same level of kick-out torque.

In a preferred arrangement the pivot point defined by the first pivoting means may be positioned on the opposite side of the tooth contact plane to the worm shaft axis, and the pivot point defined by the second pivoting means is positioned on the same side of the tooth contact plane as the worm axis.

For convenience, in this application we will refer to the worm shaft as being "above the contact plane" and the wheel gear axis "below the contact plane", the gear wheel axis lying in a horizontal plane and the worm gear axis also lying in a horizontal plane, the wheel gear axis being orthogonal to the worm gear axis. The pivot axes in this orientation may generally lie in horizontal planes and extend parallel to the axis of the gear wheel. The reader will understand that these are used here merely as relative terms and are not to be construed as limiting the location of any part in absolute terms.

The first pivot point may be located below the tooth contact plane by substantially the same distance, measured vertically, as the pivot point defined by the second pivoting means is positioned above the tooth contact plane when the assembly is oriented in the way described in the preceding paragraph.

The first direction of torque may be that which generates a tooth contact force with a component that is directed towards the motor, and the second may be opposite to this.

The gearbox assembly may include a support means that supports the main bearing substantially rigidly with respect to radial forces acting on it and flexibly with regard to axial forces acting on it, thereby permitting the main bearing to pivot about the first or second pivot without the bearing moving axially relative to the housing.

The first pivot may face the motor and the second pivot may face away from the motor.

The gearbox assembly may include a support means that supports the main bearing flexibly with regard to tilting moments acting on it whilst substantially preventing radial movement of the main bearing.

In one arrangement the support means for the main bearing may comprise a plate, for instance of spring steel, secured in one part to the main bearing and in another to the gearbox housing or to some other fixed part such as a motor housing secured to the gearbox housing.

The plate may comprise a main body part that surrounds the main bearing to which the bearing is fixed to, for example having a thickness of less than 1.5 mm, and a pair of legs that extend from respective sides of the main portion.

The legs may be substantially parallel to each other and may be cantilevered from generally near to two adjacent corners of the main portion, the legs providing a connection to the gearbox housing.

The first pivot points may be provided on a first side of the support means, and the second pivot points may be provided on a second side.

For instance, the first pivots may be provided on the side nearest the motor and the second on the opposite side nearest the worm.

The pivot points may contact the main bearing or the support.

One or more, or all, of the first pivot points, and one or more, or all, of the second pivot points, may comprise one or more abutments that are fixed in positon relative to the gearbox housing and that can contact the support or main bearing when acting as a pivot and separate from the main bearing support when not reacting a force.

The abutments may comprise hemispherical components, and may be received in a complimentary recess in the main body of the support.

The abutments may be formed from a relatively soft resilient cushioning material for example an elastomeric material such as rubber. The elastomeric material may be substantially enclosed in close fitting cavities which restrain them from excessive deformation when loaded.

Using a soft material helps minimise the risk of the pivots producing any rattle noises.

Where there are more than one first pivot, these may be spaced dispersed substantially along the line of the first pivot axis. The same is possible where there are more than one second pivot, dispersing them along the second pivot axis.

In one arrangement, there are two first pivots and two second pivots. The two first pivots may be located on opposite sides of a line passing vertically through the axis of the worm shaft, and similarly for the two second pivots. Thus, the first and second pivoting means may be positioned on opposite sides of a radial plane which is fixed relative to the main bearing.

The first pivots may be retained in the gearbox housing and the second pivots retained in one or more separate housings which are mechanically attached to the gearbox housing. For instance the second pivots may be part of or retained by a part of a motor housing that is secured to the gearbox housing.

The motor and motor housing may be considered to form a part of the gearbox assembly. The motor housing and gearbox casing may be considered to form part of a single two-part (or more parts) housing for the gearbox assembly.

Other advantages of this invention will become apparent to those skilled in the art from the following detailed description of the preferred embodiments, when read in light of the accompanying drawings.

DETAILED DESCRIPTION OF THE INVENTION

FIGS. 3 to 8 show an embodiment of a gearbox assembly 100 in accordance with an aspect of the invention that can be incorporated into an electric power assisted steering apparatus. In use the gearbox assembly 100 provides a geared reduction in the output of an electric motor of the steering apparatus, allowing torque generated by the motor to be transferred to the steering column or rack (or other part of the steering system), the torque assisting the driver to turn the wheel or providing the principle source of steering torque.

Figure 1:
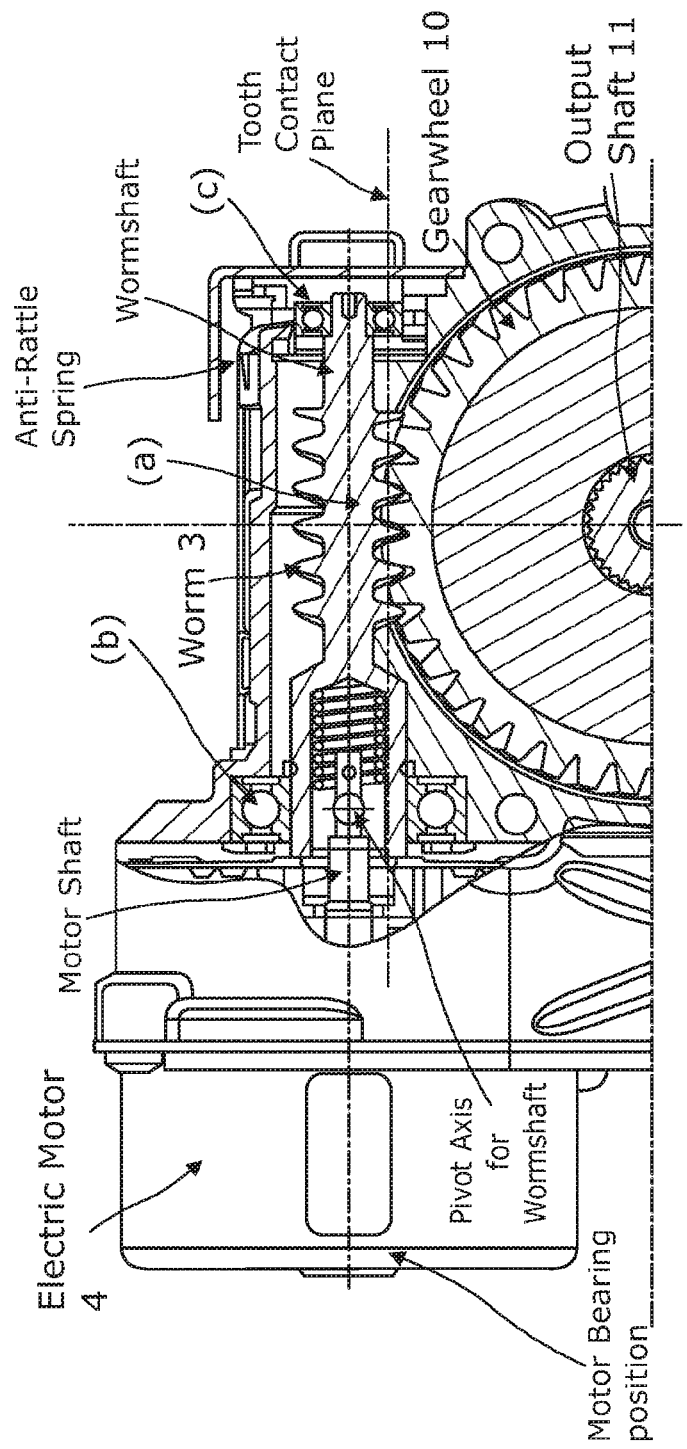
FIG. 1 is part cross section view of a prior art gearbox assembly for an electric power assisted steering system.
Figure 2:
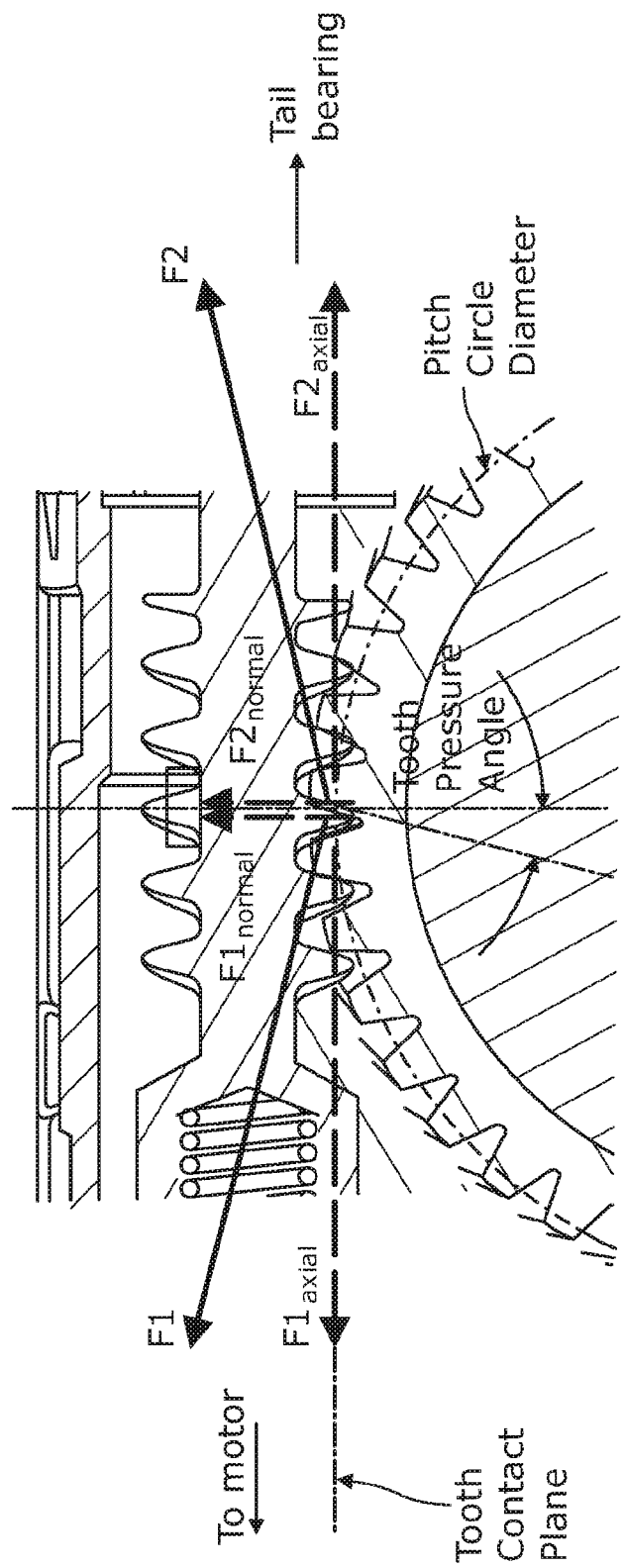
FIG. 2 shows the direction of the forces F1 and F2 applied to the flanks of the worm for a clockwise gearwheel torque and clockwise gearwheel torque in a worm and wheel gearbox.
Figure 3:
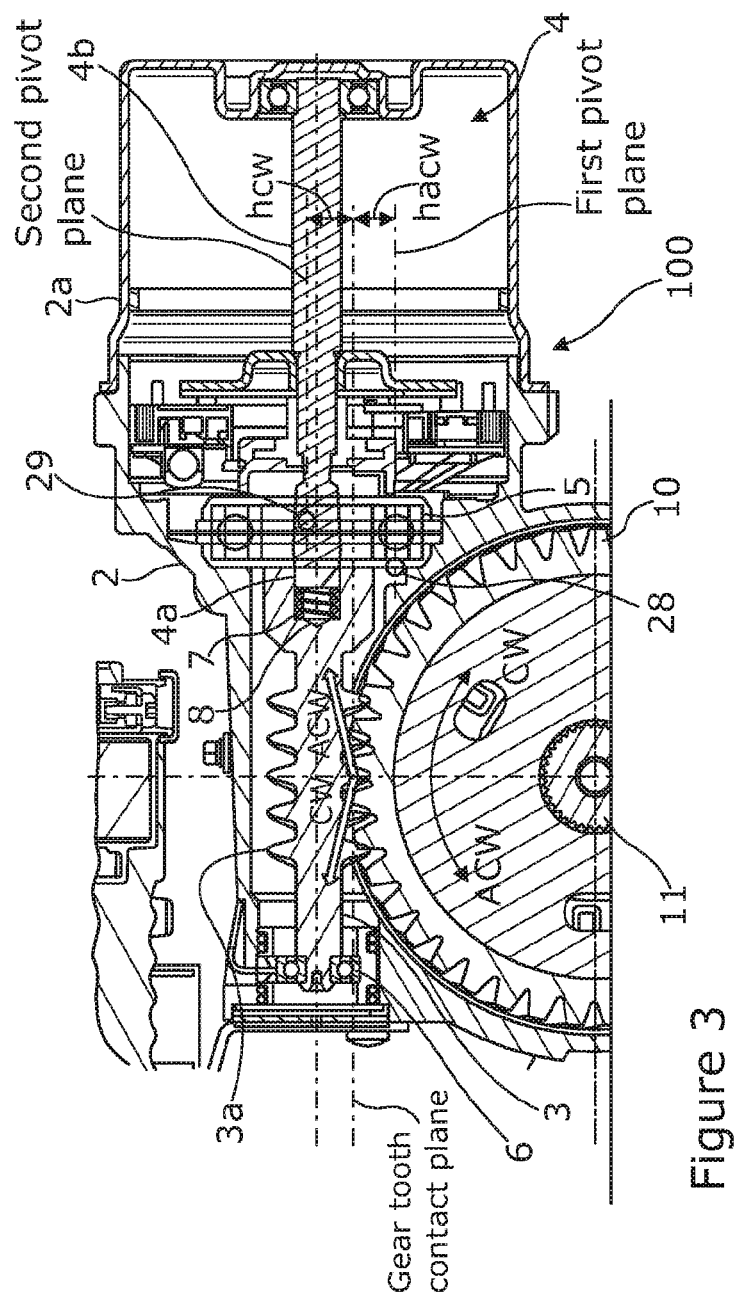
FIG. 3 is a cross section view of an embodiment of a gearbox assembly for an electric power assisted steering system in accordance with the present invention.
Figure 4:
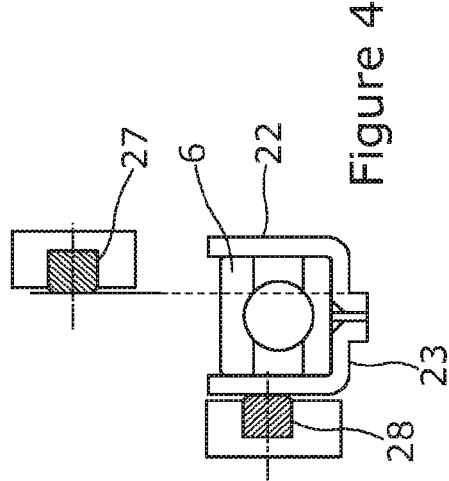
FIG. 4 is a view showing the relative position of the two pivot axes for the main bearing.
Figure 5:
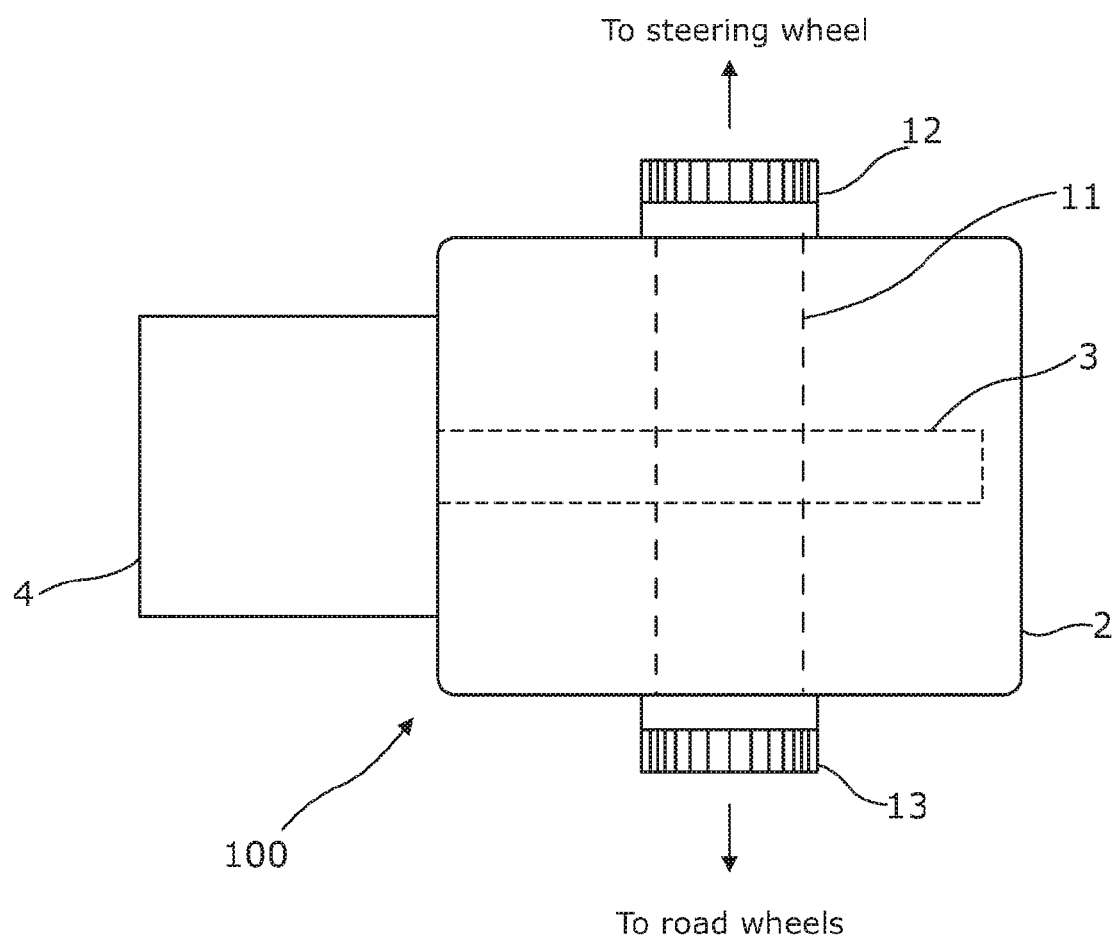
FIG. 5 is an overview of the gearbox assembly of FIGS. 3 and 4 showing the relative position of the motor, worm shaft and wheel shaft in the housing.

The gearbox assembly 100 comprises a gearbox main housing casing 2 which houses a worm shaft 3, shown in FIGS. 3 and 4. Connected to the casing 2 is a motor casing 2a (the two casings when connected effectively forming a single housing and can be considered as two-part housing). The motor casing 2a houses a rotor 4b of an electric motor 4 which terminates with a rotor pin 4a. The worm shaft 3 comprises an elongate shaft that carries a worm gear 3a. The shaft 3 is supported by a main bearing 5 at the side of the worm 3a that is closest to the motor 4 and by a tail bearing 6 at an end of the shaft 3 furthest from the motor 4. Both bearings 5,6 comprise an annular inner race that is threaded onto the shaft 3 and an annular outer race supported by the housing, with a set of ball bearings connecting the inner race to the outer race. As will be described both the main bearings are able to move, in use, by a small amount relative to the housing 2 as torque is applied to the gearbox assembly 100.

The worm shaft 3 is connected to the rotor of the motor 4 by inserting an end of the rotor pin (that is secured to the rotor) into a bore 7 formed in the end of the shaft 3. A coil spring 8 is located in the bore, threaded onto the shaft 3. The spring 8 acts between the blind base of the bore and a bush that is slidably located in the bore and engages the rotor pin 4a. The spring applies a force that biases the worm shaft 3 away from the rotor pin 4a, any movement of the shaft towards the motor rotor increasingly compressing the spring. It is also notable that the rotor pin has a spherical head where it engages the sliding bush 9 so that he worm shaft can pivot around the rotor pin. The pivot point for this movement is on the axis of the shaft, although the location of that point along the shaft may vary depending on the exact location of the sliding bush 9 within the bore 7.

The worm 3a is connected to a gear wheel 10 that is also housed in the housing. The wheel 10 is supported on an output shaft 11 (shown in FIG. 5), the two ends 12, 13 of which are accessible from outside of the gearbox. One end 11 of the output shaft 11 is connected to the steering shaft and onwards to the steering wheel (not shown), and the other end 13 of the output shaft 11 is connected to the steering rack and onwards to the road wheels. The output shaft 11 therefore provides a mechanical path directly from the steering wheel to road wheels in this example and the gear wheel transfers torque from the motor to the output shaft to assist the driver.

The gear wheel 10 and worm gear 3a each have complimentary teeth that are meshed and may be in a single contact or double contact condition. In the former, each worm tooth that is engaged with the worm wheel at a given instant in time will contact at most only a single gear wheel tooth, and in the latter condition at least one worm tooth will be in contacts the flanks of two gear wheel teeth at a given instant in time. The teeth have a tooth pressure angle in this example of 14 degrees.

The main bearing 5 and tail bearing 6 allow some controlled axial movement of the worm shaft 3 and pivoting of the worm shaft. The manner in which the bearing are supported relative to the housing 2 will now be described.

Figure 6:
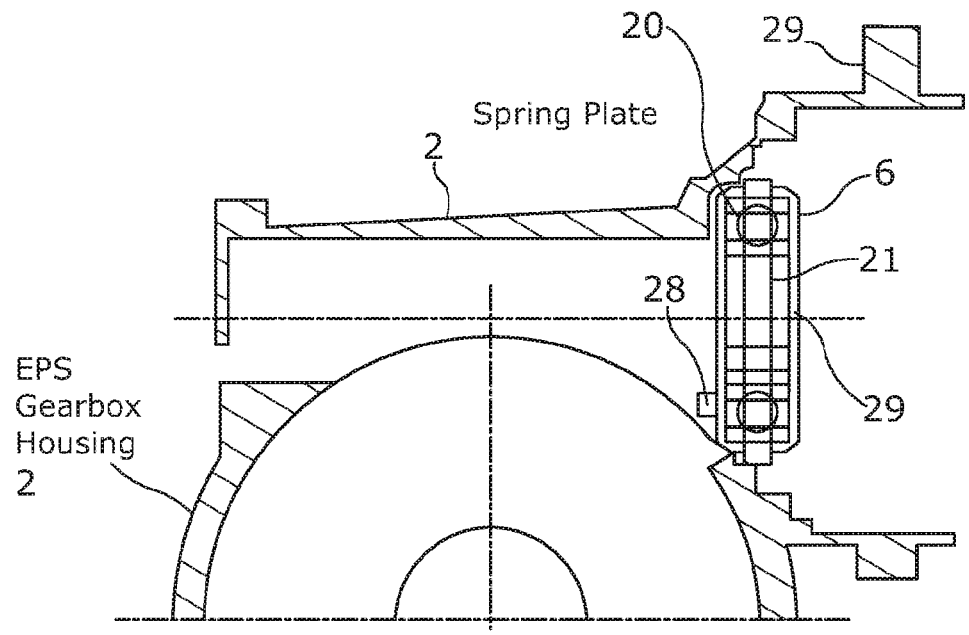
FIG. 6 is a simplified view corresponding to FIG. 3 showing more clearly the support from the main bearing.

As shown in FIG. 6, the main worm shaft bearing 5 is mounted into a close fitting central hole 20 of a spring plate 21 by means of two bearing holders 22, 23. The spring plate has a main body that 24 locates the central hole and two legs 25, 26 that cantilever from the main body. The two bearing holders 22, 23 contact the main body of 21 so that the legs protrude from the sides of the bearing holders, the spring plate otherwise being sandwiched between these. This sub-assembly may be fixed together by four squeeze rivets at the corners. The main bearing 6 has minimal internal clearance and may be of the 4-point contact type.

Figure 7:
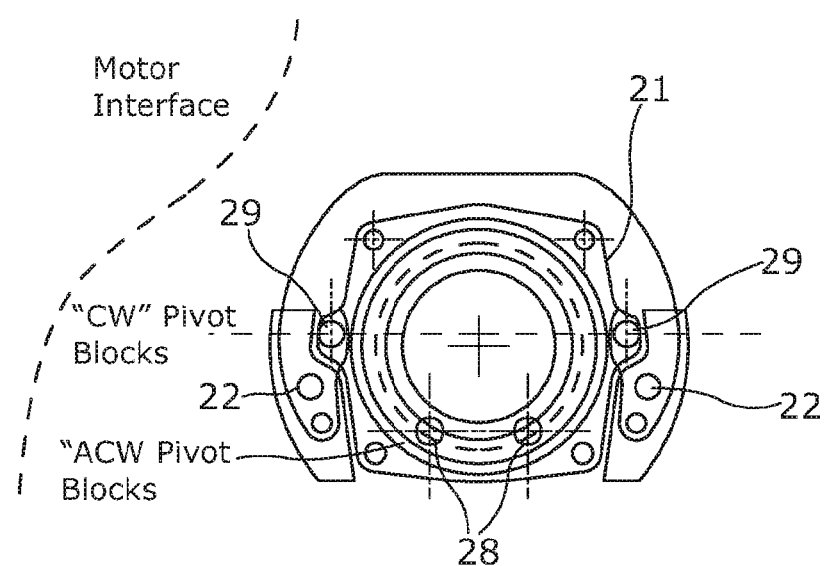
FIG. 7 is a view looking down the axis of the worm shaft of the support and main bearing shown in FIG. 6.
Figure 8:
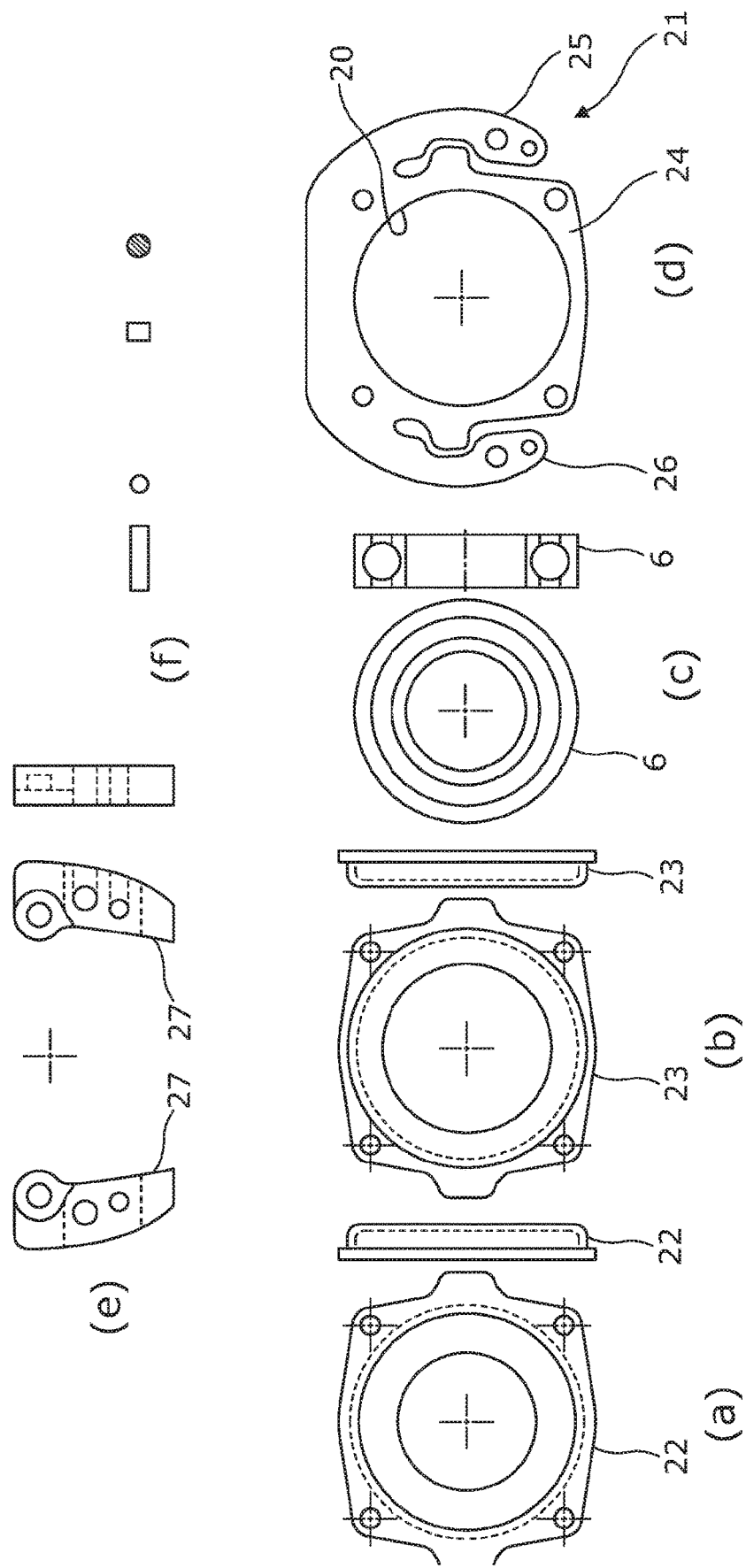
FIGS. 8(a) to (f) show in detail the various parts of the main bearing at the support assembly prior to installation.

The sub-assembly is accurately positioned in the gearbox housing 2 by two dowels shown in FIG. 7 and FIG. 8(f) which locate it in a hole in each of the vertical legs 25, 26 of the spring plate 21. The spring plate 21 is secured to the housing by two screws which pass through a further hole in each of the vertical legs and which are also used to secure two blocks, called reversal plates 27, to the housing 2. These blocks are shown in FIG. 8(e).

The axial forces acting on the worm shaft 3 are transmitted to the housing 2 through the main bearing and subassembly by two pairs of cylindrical rubber blocks 28, 29 which are respectively inserted into holes in the housing 2 and in the reversal plates 27. Each block forms a pivot.

The two blocks 28 in the gearbox housing 2 react axial forces directed away from the motor due to torque from the gearwheel acting in a first direction (ACW) and those in the reversal plates react the axial forces due to torque from the gearwheel in a second, opposite, direction.

Each respective pair of pivots creates a pivoting axis for the worm shaft around which it tries to tilt when the said directions of torque are applied. The two pivot axes are at different locations relative to the tooth contact plane. This can be seen most clearly in FIG. 3 and also FIG. 4. These positions are at heights hCW and hACW relative to the tooth contact plane (see FIG. 3). Using a tooth angle of 14 degrees for this example, because tan 14°=0.25, hCW and hACW must be equal to 0.25 times the respective horizontal distances of the two pivot positions from the gearbox centreline. Note the pivot for torque in the first direction (ACW) are below the tooth contact plane, and those for the second direction (CW) are above the tooth contact plane.

The spring plate 21 itself is not intended to resist the axial forces acting on the worm shaft and it is shaped so as to also provide minimal resistance to the tilting of the worm shaft. The spring plate behaves rigidly only with respect to radial forces acting on the main bearing.

Note that the axial (horizontal) tooth force component changes directions for the first direction of gearwheel torque versus the second direction of gearwheel torque whereas the normal (vertical) component does not. This is accommodated by the two different pivot axis positions defined by the first and second pivots.

In practice, it may be preferable not to totally cancel out the separation force because any tendency for the worm shaft to pull itself into mesh at high torques would make the gearbox less efficient. It may therefore be advantageous to reduce the separation force by approximately 75% instead. Hence, an anti-rattle spring may still be needed but it can be designed to only produce 25% of the original meshing force and therefore the associated quiescent friction should also be reduced to 25%, giving a substantial improvement. Note that retaining some amount of ARS load is useful to prevent the worm shaft bouncing out of mesh in dynamic conditions.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A gearbox assembly for an electric power assisted steering apparatus including a motor, the gearbox assembly comprising:
    a gearbox housing which houses a worm shaft and a gear wheel, the worm shaft being supported relative to the gearbox housing by a main bearing at an end configured to be closest to the motor and by a tail bearing at an end configured to be furthest from the motor, and the gear wheel being supported by an output shaft having at least one end that provides a take-off from the gearbox assembly,
    in which the main bearing and tail bearing are free to move relative to the gearbox housing through a limited range of motion that enables the worm shaft to pivot away from the gear wheel, the gearbox assembly further comprising:
    a first pivoting means for the worm shaft main bearing which reacts an axial component of the worm shaft tooth load for a first direction of gearwheel torque but not for a second, opposing, direction of gearwheel torque and defines at least one first pivot point about which the main bearing pivots that is located on a pivot axis,
    a second pivoting means for the worm shaft main bearing, positioned distal from the first pivoting means, which reacts the axial component of the worm shaft tooth load for a second direction of gearwheel torque but not the first direction of gearwheel torque and defines at least one second pivot point about which the main bearing pivots that is located on a second pivot axis, the second pivot point being spaced apart from the first pivot point.

2. The gearbox assembly according to claim 1 in which the at least one first pivot point defined by the first pivoting means is positioned on an opposite side of a tooth contact plane to an axis of the worm shaft, and the at least one second pivot point defined by the second pivoting means is positioned on the same side of the tooth contact plane as the worm shaft axis.

3. The gearbox assembly according to claim 2 in which the at least one first pivot point defined by the first pivoting means is located below the tooth contact plane by substantially the same distance, measured vertically, as the at least one second pivot point defined by the second pivoting means is positioned above the tooth contact plane.

4. The gearbox assembly according to claim 1 in which the first direction of gearwheel torque is the direction that generates a tooth contact force with a component that is directed towards the motor.

5. The gearbox assembly according to claim 1 in which the first pivoting means faces the motor and the second pivoting means faces away from the motor.

6. The gearbox assembly according to claim 1 that further includes a support means that supports the main bearing flexibly with regard to tilting moments acting on the main bearing whilst substantially preventing radial movement of the main bearing and in which the at least one first pivot point is provided on a first side of the support means and the at least one second pivot point is provided on a second side of the support means.

7. The gearbox assembly according to claim 6 in which the support means for the main bearing comprises a plate secured in one part to the main bearing and in another to the gearbox housing or to some other fixed part secured to the gearbox housing.

8. The gearbox assembly according to claim 7 in which the plate comprises a main body part that surrounds the main bearing to which the main bearing is fixed and a pair of legs that extend from respective sides of the main body part.

9. The gearbox assembly according to claim 6 in which each of the at least one first pivot point and the at least one second pivot point comprise one or more abutments that are fixed in positon relative to the gearbox housing and that can contact the support means or main bearing when acting as a pivot and separate from the main bearing when not reacting a force.

10. The gearbox assembly according to claim 7 in which the fixed part is a motor housing secured to the gearbox housing.

* * * * *